(12) United States Patent
Chang

(10) Patent No.: US 7,987,556 B2
(45) Date of Patent: *Aug. 2, 2011

(54) HINGE AND INTERFERENCE APPARATUS FOR THE SAME

(75) Inventor: Jung-Bin Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 374 days.

This patent is subject to a terminal disclaimer.

(21) Appl. No.: 12/202,331

(22) Filed: Sep. 1, 2008

(65) Prior Publication Data

US 2010/0000370 A1 Jan. 7, 2010

(30) Foreign Application Priority Data

Jul. 4, 2008 (CN) .................... 2008 2 0301439 U

(51) Int. Cl.
*E05D 11/10* (2006.01)
(52) U.S. Cl. .......................................... 16/330; 16/340
(58) Field of Classification Search ............ 16/337–339, 16/342, 330, 303, 374, 376, 377, 340, 355, 16/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794

See application file for complete search history.

(56) References Cited

U.S. PATENT DOCUMENTS

| | | | | |
|---|---|---|---|---|
| 4,186,905 | A * | 2/1980 | Brudy | 248/478 |
| 7,533,446 | B1 * | 5/2009 | Lin | 16/330 |
| 7,607,201 | B2 * | 10/2009 | Lin | 16/330 |
| 2005/0276412 | A1 * | 12/2005 | Kfoury | 379/433.13 |
| 2006/0185126 | A1 * | 8/2006 | Su | 16/340 |
| 2007/0169312 | A1 * | 7/2007 | Ho et al. | 16/330 |
| 2007/0174996 | A1 * | 8/2007 | Lu et al. | 16/340 |
| 2007/0180656 | A1 * | 8/2007 | Chen et al. | 16/340 |
| 2007/0295211 | A1 * | 12/2007 | Yang | 95/285 |
| 2009/0235489 | A1 * | 9/2009 | Chang et al. | 16/340 |
| 2010/0024165 | A1 * | 2/2010 | Kosugi et al. | 16/303 |

* cited by examiner

*Primary Examiner* — Chuck Y. Mah
(74) *Attorney, Agent, or Firm* — Zhigang Ma

(57) ABSTRACT

A hinge includes a first bracket, a second bracket, a shaft, and first and second interference elements. The shaft is fixed to the first bracket. The second bracket rotationally fit about the shaft. The first interference element is rotationally mounted on the shaft and fixed to the second bracket, and defines two unleveled surfaces at one side. The second interference element is immovably mounted on the shaft beside the first interference element, and defines two unleveled surfaces at one side facing and corresponding to the unleveled surfaces of the first interference element.

20 Claims, 8 Drawing Sheets

US 7,987,556 B2

HINGE AND INTERFERENCE APPARATUS FOR THE SAME

CROSS-REFERENCE TO RELATED APPLICATION

Related subject matter is disclosed in co-pending U.S. patent application Ser. No. 12/205,931, filed concurrently with the present application, entitled "HINGE AND INTERFERENCE APPARATUS FOR THE SAME", which is assigned to the same assignee as that of the present application. The inventor of the co-pending application is Jung-Bin Chang. The Specification and Drawings of the co-pending application is incorporated herein by reference.

BACKGROUND

1. Field of the Invention

The present invention generally relates to hinges and, particularly, to a hinge for a foldable electronic device and an interference apparatus for the hinge.

2. Description of Related Art

A foldable electronic device including a main body and a display often uses a hinge to interconnect the main body and the display, which allows the display to be rotational with respect to the main body, and can also be folded with the main body for saving space.

A hinge normally includes two pieces respectively fixed to the main body and the display of the foldable electronic device. The pieces are rotational relative to each other. A protrusion protrudes from the first member, and a recession is defined in the second member. During rotation, when the angle of the main body and the display are within a special range, the protrusion can be received in the recession automatically, and the display is maintained at a fixed angle with respect to the main body unless external forces are applied. Typically, the protrusion and the recession are not durable. After frequent usage and due to wear and tear, the protrusion and the recession could no longer fit together tightly, thereby preventing the display from being stopped during rotation. Even worse, when the protrusion or the recession is worn out, the display cannot maintain stability at any angle with respect to the main body, which creates a quite inconvenience for users.

DETAILED DESCRIPTION

Figure 1:
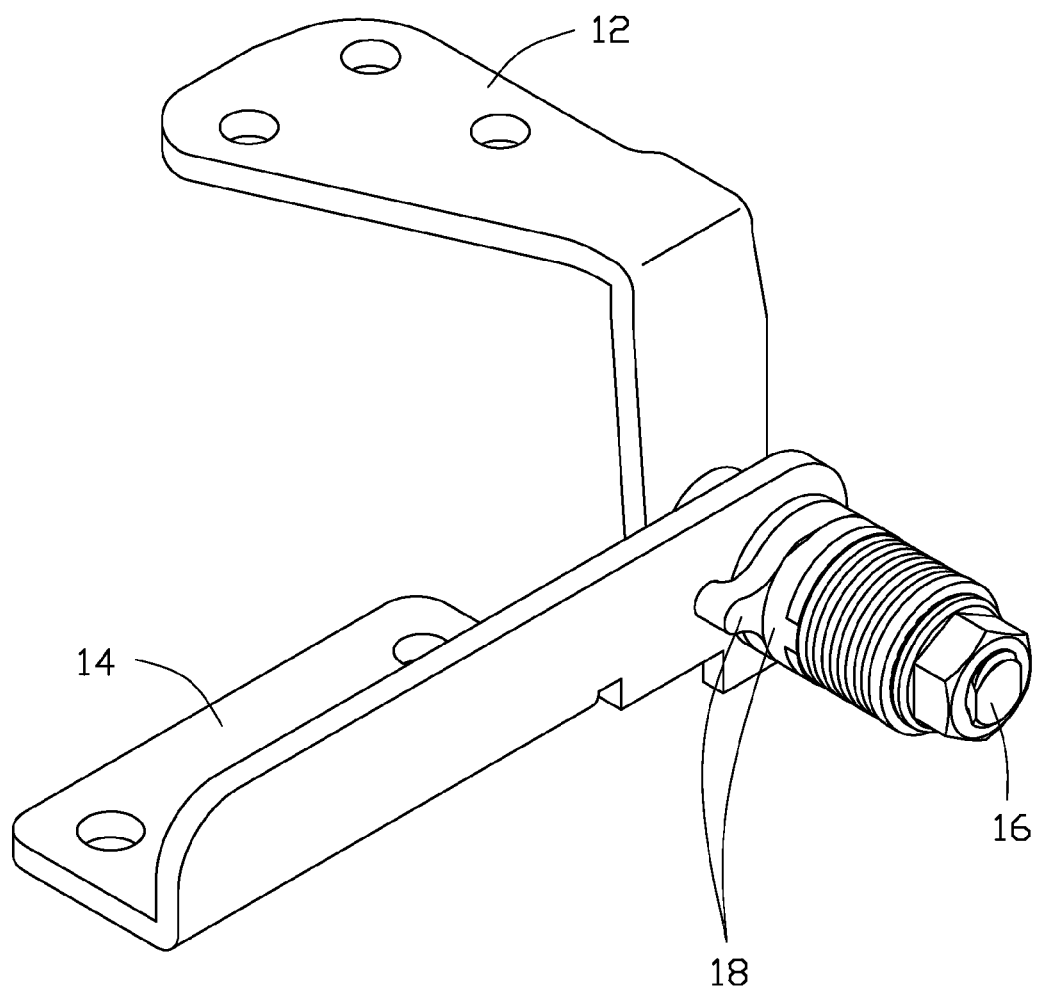
FIG. 1 is an assembled, isometric view of a hinge in accordance with an exemplary embodiment.

Referring to FIG. 1, a hinge in accordance with an exemplary embodiment includes a first bracket 12, a second bracket 14, a shaft 16, and an interference apparatus 18.

The first bracket 12 and the second bracket 14 are rotational relative to each other. The first bracket 12 is used for being fixed to a first part of an electronic device (not shown), such as a display. The second bracket 14 is used for being fixed to a second part of the electronic device, such as a main body. Therefore, the first and second parts of the electronic device are rotational with respect to each other. The interference apparatus 18 is configured on the shaft 16.

Figure 2:
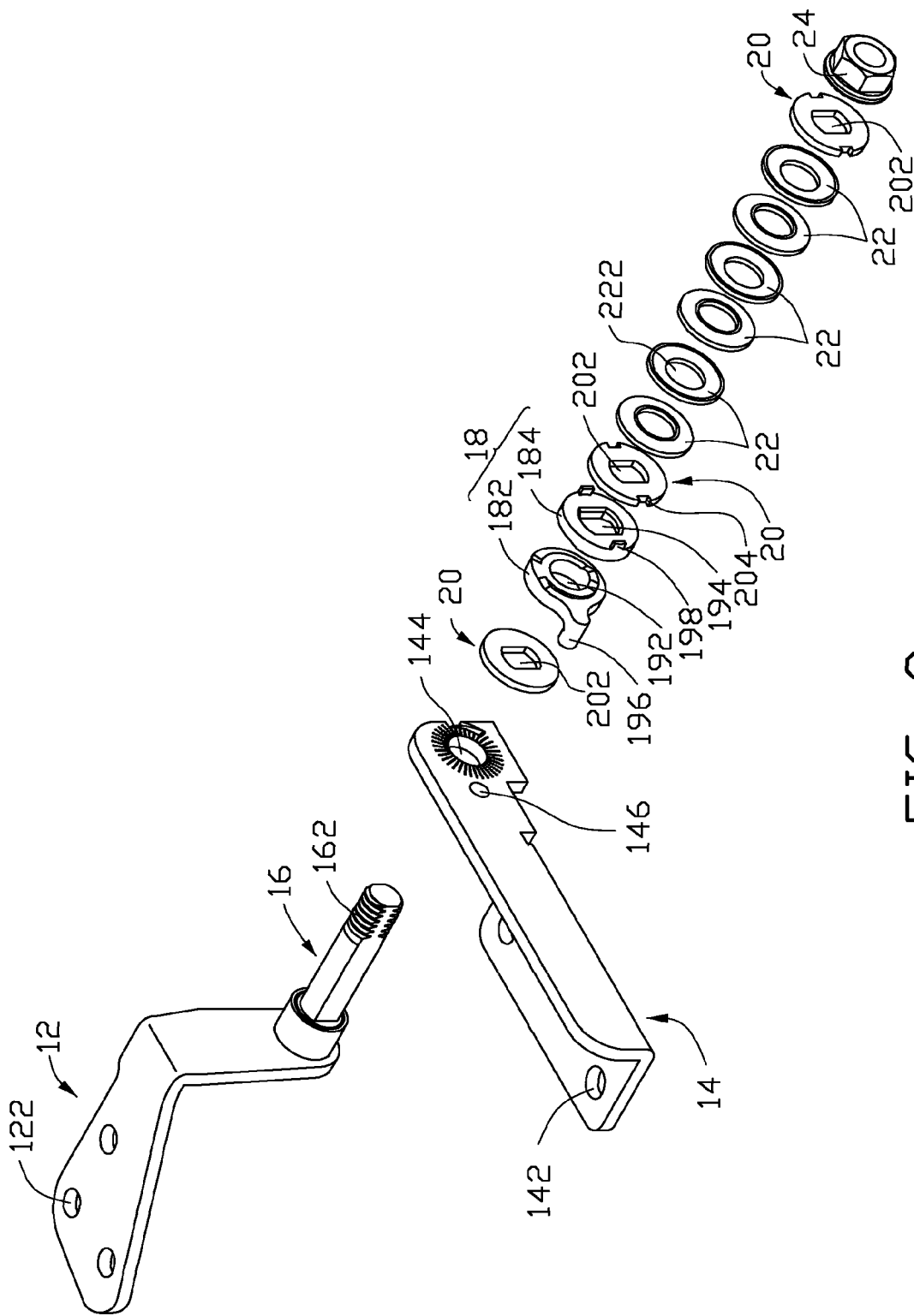
FIG. 2 is an exploded, isometric view of the hinge of FIG. 1, the hinge including a first interference element and a second interference element.

Referring to FIG. 2, the hinge further includes a plurality of rings 20, a plurality of washers 22, and a fastener 24, all engaged on the shaft 16.

The first bracket 12 defines a plurality of fixing holes 122 for allowing screws or rivets to extend through, thereby fixing the first bracket 12 to the first part of the electronic device. Similarly, the second bracket 14 defines a plurality of fixing holes 142 for allowing screws or rivets to extend through, thereby fixing the second bracket 12 to the second part of the electronic device. The second bracket 14 further defines a round shaft hole 144 and a retaining hole 146 beside the shaft hole 144.

The shaft 16 is fixed to an end of the first bracket 12, and a distal end of the shaft 16 is non-circular, defining a threaded portion 162 thereon. The shaft 16 extends through the shaft hole 144 of the second bracket 14, thereby allowing the second bracket 14 to rotate freely relative to the shaft 16 and the first bracket 12.

The interference apparatus 18 includes a first interference element 182 and a second interference element 184, both of which are engaged on the shaft 16. The first interference element 182 defines a circular through hole 192 for rotationally fitting the shaft 16, and the second interference element 184 defines a non-circular through hole 194 for engaging the shaft 16. The shape of the non-circular through hole 194 corresponds to the cross-section of the non-circular shaft 16, and thus, the second interference element 184, the shaft 16, and the first bracket 12 are immovable with one another.

The first interference element 182 includes a post 196 protruding therefrom to be engaged in the retaining hole 146 of the second bracket 14, thereby fixing the first interference element 182 to the second bracket 14. Moreover, a first ring of the rings 20 is engaged on the shaft 16 between the second bracket 14 and the first interference element 182. The first ring 20 defines a non-circular through hole 202 therein corresponding to the cross-section of the shaft 16, thereby making it immovable on the shaft 16. A second ring of the rings 20 is engaged on the shaft 16 and attached to a side of the second interference element 184, away from the first interference element 182. The second ring 20 defines two opposite slots 204 in a circumference thereof. Correspondingly, two opposite blocks 198 protrude from a circumference of the second interference element 184. The blocks 198 are engaged in the corresponding slots 204, to fix the second interference element 184 with the second ring 20.

Each of the washers 22 defines a circular through hole 222 therein, for allowing the shaft 16 to extend therethrough. The washers 22 are generally made of elastic material. A third ring of the rings 20 is fitted about the shaft 16 and attached to one of the washers 22, away from the second ring 20. After the fastener 24 has been screwed to the threaded portion 162 of the shaft 16, the washers 22 provide elastic forces along an axial direction to tighten the second bracket 14, the interference apparatus 18, and the rings 20.

Figure 3:
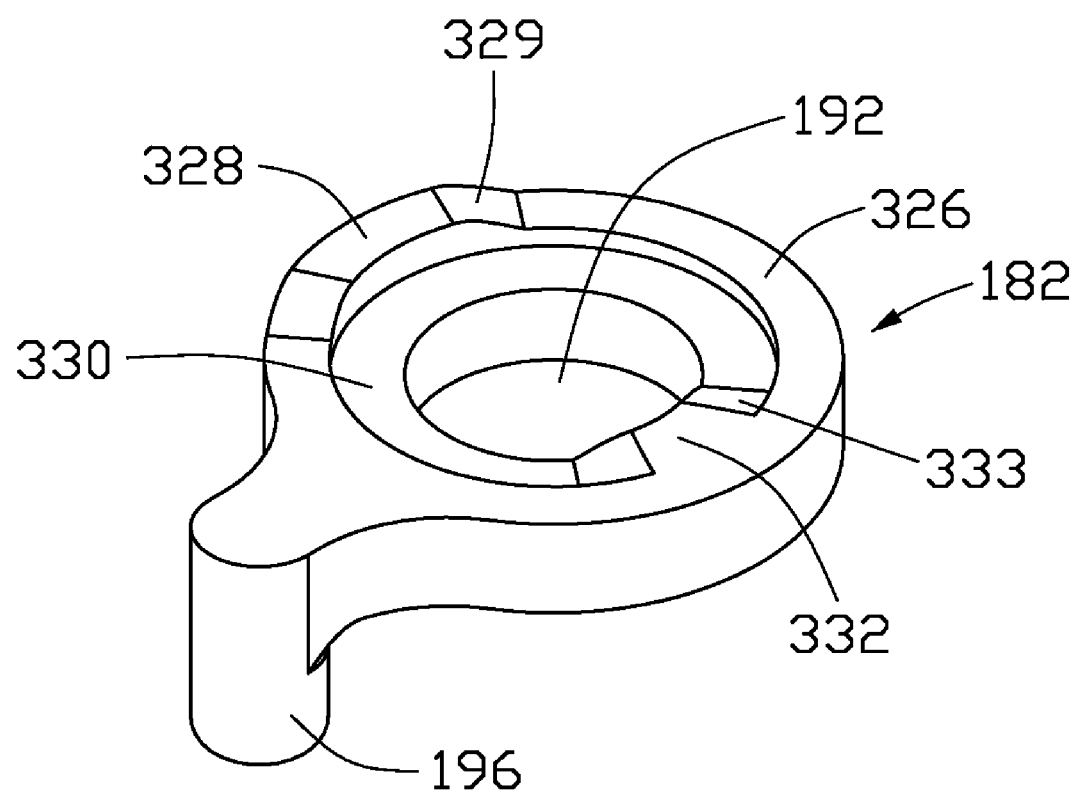
FIG. 3 is an isometric view of the first interference element of FIG. 2, but viewed from another perspective.

Referring to FIG. 3, a side surface opposite to the side that the post 196 of the first interference element 182 is protruded includes an outer circle 326 neighboring a circumference of the first interference element 182, and an inner circle 330 neighboring and surrounding the through hole 192. A protrusion 328 protrudes from the outer circle 326. The protrusion 328 includes two slanted surfaces 329 at two ends thereof to connect the top of the protrusion 328 and the outer circle 326. The inner circle 330 is descended from and rounded by the outer circle 326. Therefore, the inner circle 330 and the outer circle 326 collectively define a step. A protrusion 332 protrudes from the inner circle 330, with the top thereof being leveled with the outer circle 326. The protrusion 332 includes two slanted surfaces 333 at two ends thereof to connect the top of the protrusion 332 with the inner circle 330. The protrusions 328 and 332 are opposite across the through hole 192.

Figure 4:
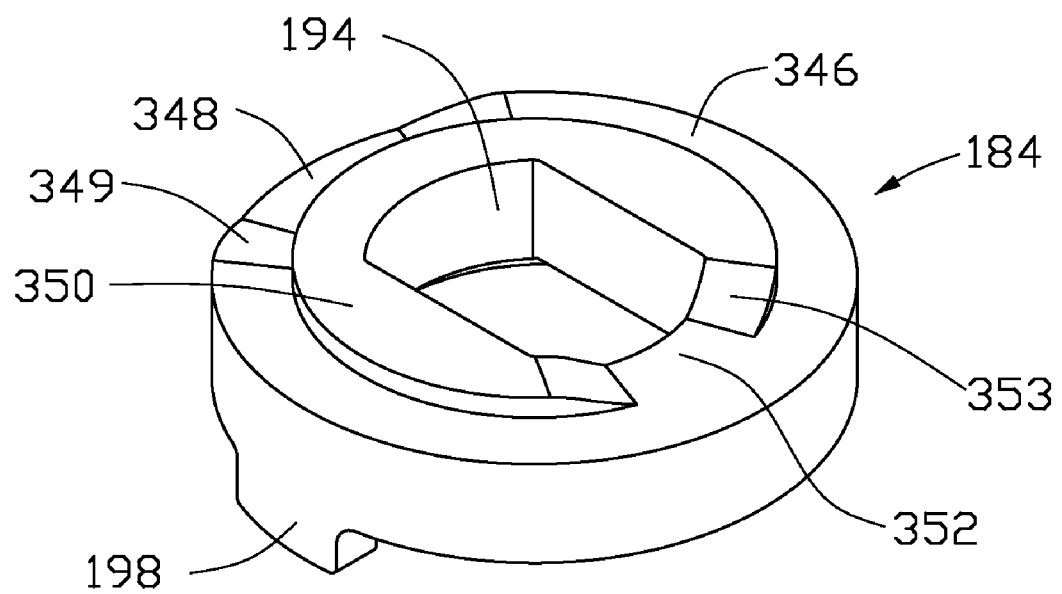
FIG. 4 is an isometric view of the second interference element of FIG. 2, but viewed from another perspective.

Referring to FIG. 4, a side surface opposite to the blocks 198 of the second interference element 184 includes an outer circle 346 neighboring a circumference of the second interference element 184, and an inner circle neighboring and surrounding the through hole 194. A recession 348 is defined in the outer circle 346. The recession 348 includes two slanted surfaces 349 at two ends thereof to connect the outer circle 346 and the bottom of the recession 348. The inner circle 350 rises from and rounded by the outer circle 346 of the second interference element 184. Therefore, the inner circle 350 and the outer circle 346 collectively define a step (not labeled) on the side surface of the second interference element 184 corresponding to the step of the first interference element 182. A recession 352 is defined in the inner surface 350, with the bottom thereof being generally leveled with the outer circle 346. The recession 352 includes two slanted surfaces 353 at two ends thereof to connect the inner surface 350 and the bottom of the recession 352. Corresponding to the protrusions 328 and 332 of the first interference element 182, the recessions 348 and 352 are opposite across the through hole 194.

Figure 5:
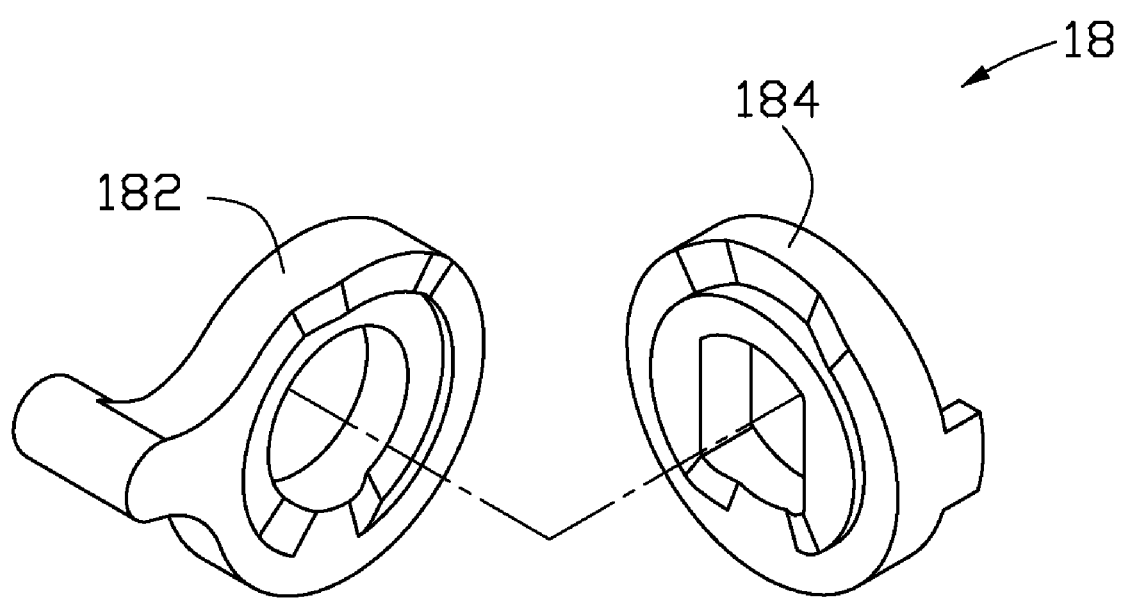
FIG. 5 is an isometric view of the first interference element of FIG. 3 and the second interference element of FIG. 4.

Referring also to FIG. 5, the first and second interference elements 182, 184 are fitted about the shaft 16, with the stepped side surface of the first interference element 182 facing and contacting the stepped side surface of the second interference element 184. When the first part of the electronic device rotates relative to the second part of the electronic device, the first interference element 182 rotates relative to the second interference element 184. When the first interference element 182 is compressed to the second interference element 184 during rotation, the protrusions 328 and 332 of the first interference element 182 are guided to enter and are received in the corresponding recessions 348 and 352 of the second interference element 184. The steps of the first interference element 182 and the second interference element 184 are engaged with each other, with the outer circle 326 of the first interference element 182 being close to the outer circle 346 of the second interference element 184, and the inner circle 330 of the first interference element 182 being close to the inner circle 350 of the second interference element 184. Therefore, extra engagement is provided in addition to the engagement between the protrusions 328, 332 and the recessions 348, 352.

Figure 6:
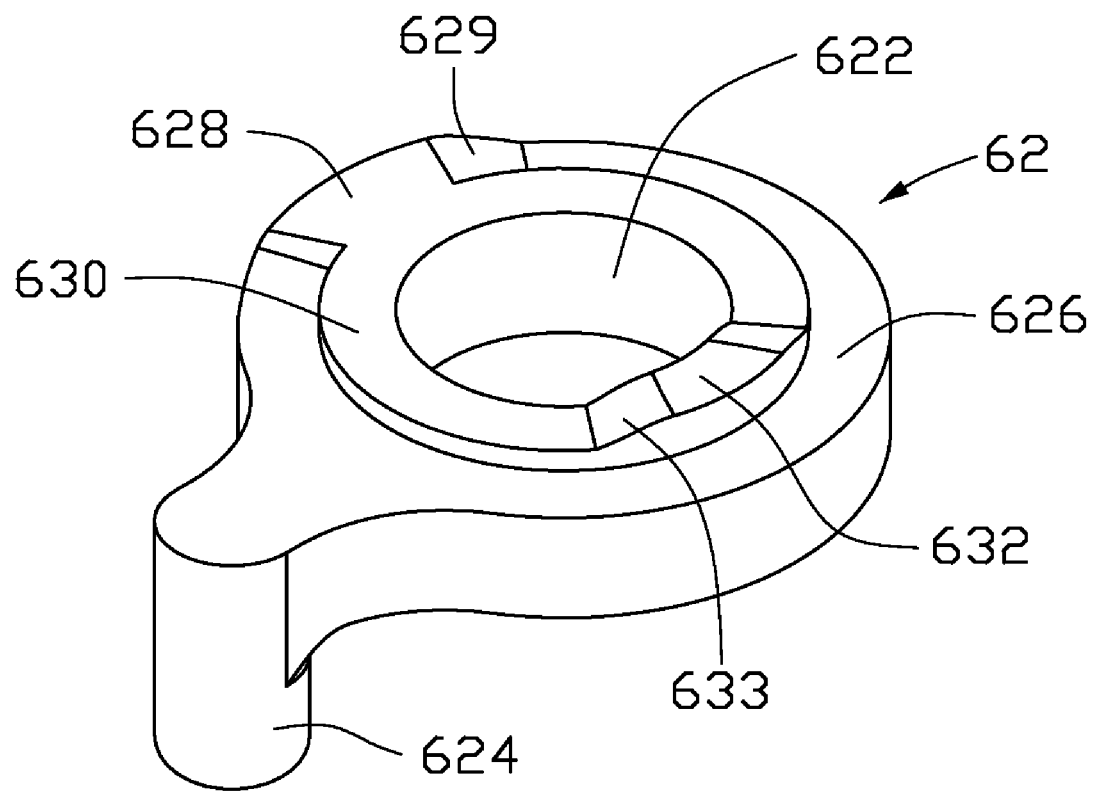
FIG. 6 is an isometric view of a first interference element of a hinge in accordance with a second exemplary embodiment.

Referring to FIG. 6, according to a second exemplary embodiment, the first interference element 62 defines a round through hole 622 for allowing the shaft 16 to extend through. A side surface of the first interference element 62 includes an outer circle 626 neighboring a circumference of the first interference element 62, and an inner circle 630 neighboring and surrounding the through hole 622. A protrusion 628 protrudes from the outer circle 626. The protrusion 628 includes two slanted surfaces 629 at two ends thereof to connect the top of the protrusion 628 and the outer circle 626. The inner circle 630 rises from and is rounded by the outer circle 626 of the first interference element 62. Therefore, the inner circle 630 and the outer circle 626 collectively define a step. The inner circle 630 is generally leveled with the top of the protrusion 628. A protrusion 632 is further protruded from the inner circle 630. The protrusion 632 includes two slanted surfaces 633 at opposite ends thereof to connect the inner circle 630 and the top of the protrusion 632. The protrusions 628 and 632 are opposite across the through hole 622.

Figure 7:
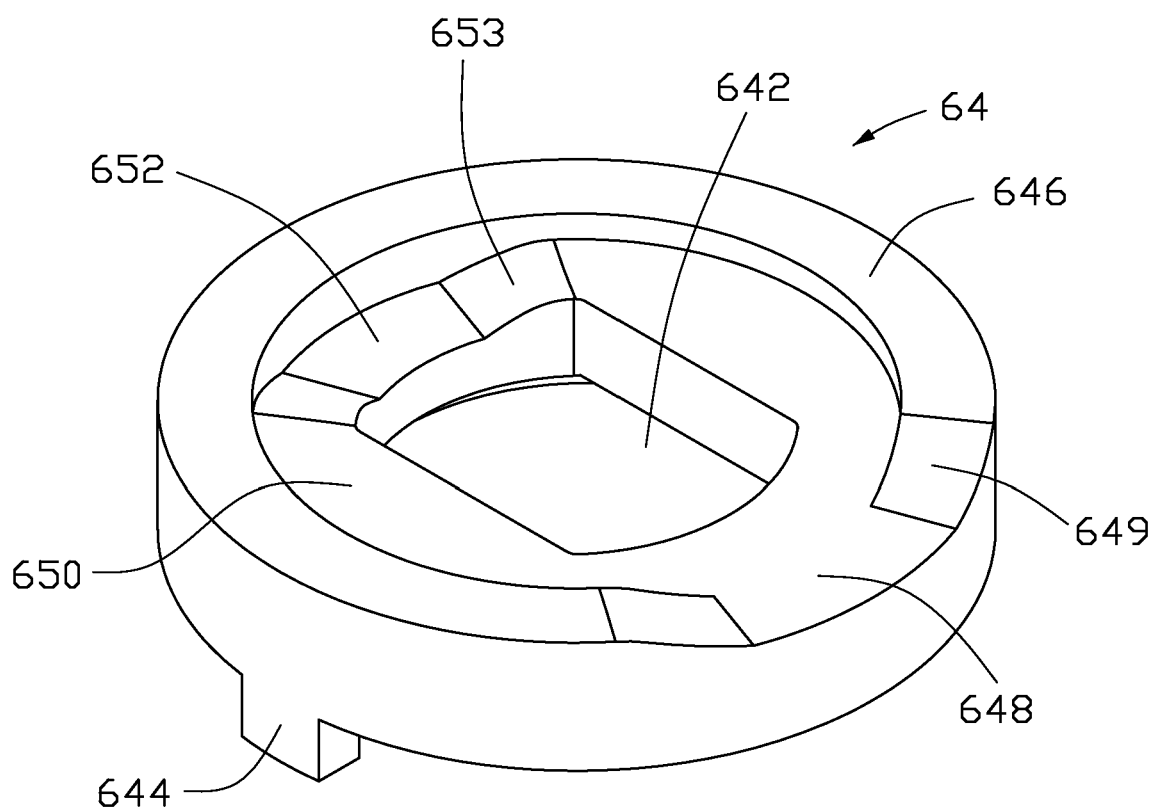
FIG. 7 is an isometric view of a second interference element of the hinge of FIG. 6.

Referring also to FIG. 7, according to the first interference element 62 of the second embodiment, the second interference element 64 defines a non-circular through hole 642 for engaging the shaft 16. As a result, the second interference element 64 is fixed to and immovable with the shaft 16. The second interference element 64 includes two blocks 644 protruding therefrom away from the first interference element 62. A side surface of the second interference element 64 includes an outer circle 646 neighboring a circumference of the second interference element 64, and an inner circle 650 neighboring and surrounding the through hole 642. A recession 648 is defined in the outer circle 646 of the second interference element 64. The recession 648 includes two slanted surfaces 649 at two ends thereof to connect the outer circle 646 and a bottom of the recession 648. The inner circle 650 is descended from and rounded by the outer circle 646 of the second interference element 64. The inner circle 650 is leveled with the bottom of the recession 648. Therefore, the inner circle 650 and the outer circle 646 collectively define a step corresponding to the step of the first interference element 62. A recession 652 is further defined in the inner circle 650. The recession 652 includes two slanted surfaces 653 at two ends thereof to connect the inner circle 650 and the bottom of the recession 652. The recessions 648 and 652 are opposite across the through hole 642.

Figure 8:
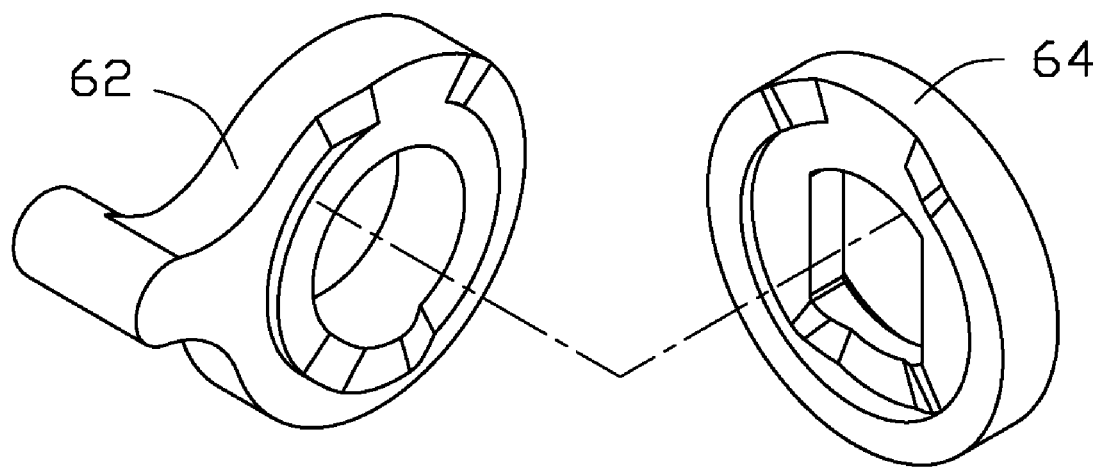
FIG. 8 is an isometric view of the first interference element of FIG. 6 and the second interference element of FIG. 7.

Referring also to FIG. 8, when the first interference element 62 is compressed to the second interference element 64 during rotation, the protrusions 628 and 632 of the first interference element 62 are guided to enter and are received in the recessions 648 and 652 of the second interference element 64. The steps of the first interference element 62 and the second interference element 64 are engaged with each other, with the inner circle 626 of the first interference element 62 being close to the inner circle 646 of the second interference element 64, and the outer circle 630 of the first interference element 62 being close to the outer circle 650 of the second interference element 64. Therefore, extra engagement is provided besides the engagement between the protrusions 628, 632 and the recessions 648, 652.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A hinge comprising:
a first bracket;
a shaft fixed to the first bracket;
a second bracket rotationally fitting about the shaft;
a first interference element rotationally mounted on the shaft and fixed to the second bracket, the first interference element defining at least two unleveled surfaces at one side surface thereof facing away from the second bracket, and comprising at least two protrusions respectively protruding from the at least two unleveled surfaces;

a second interference element immovably mounted on the shaft and beside the first interference element, the second interference element defining at least two unleveled surfaces at one side surface thereof facing and correspondingly mating with the at least two unleveled surfaces of the first interference element, and at least two recessions respectively located on the at least two unleveled surfaces of the second interference element and corresponding to the at least two protrusions of the first interference element; and fastening means capable of keeping the first interference element and the second interference element in contact on the shaft; and a plurality of washers mounted to the shaft to provide elastic forces along an axial direction of the shaft to press the second bracket, the first interference element, and the second interference element to firmly resist against each other.

2. The hinge of claim 1, wherein the first interference element comprises a post protruding therefrom, the second bracket defines a retaining hole therein, the post engages in the retaining hole, for fixing the first interference element to the second bracket.

3. The hinge of claim 2, wherein the at least two unleveled surfaces of the first interference element face away from the post.

4. The hinge of claim 1, wherein the first interference element further defines a round through hole in a center thereof for fitting about the shaft, the at least two protrusions of the first interference element are opposite across the through hole of the first interference element.

5. The hinge of claim 4, wherein the shaft defines a non-circular cross-section, the second interference element further defines a non-circular through hole in a center thereof for engaging the shaft, the at least two recessions are opposite across the through hole of the second interference element, and capable of receiving the corresponding at least two protrusions.

6. The hinge of claim 5, wherein the at least two unleveled surfaces of the first interference element are a first inner circle neighboring and surrounding the through hole of the first interference element, and a first outer circle neighboring a circumference of the first interference element and surrounding the first inner circle; the first inner circle rises from the first outer circle.

7. The hinge of claim 6, wherein the at least two unleveled surfaces of the second interference element are a second inner circle neighboring and surrounding the through hole of the second interference element, and a second outer circle neighboring a circumference of the second interference element and surrounding then second inner circle; the second inner circle descending from the second outer circle.

8. The hinge of claim 5, wherein the at least two unleveled surfaces of the first interference element are a first inner circle neighboring and surrounding the through hole of the first interference element, and a first outer circle neighboring a circumference of the first interference element and surrounding the first inner circle; the first inner circle descending from the first outer circle.

9. The hinge of claim 8, wherein the at least two unleveled surfaces of the second interference element are a second inner circle neighboring and surrounding the through hole of the second interference element, and a second outer circle neighboring a circumference of the second interference element and surrounding the second inner circle; the second inner circle rises from the second outer circle.

10. The hinge of claim 1, wherein each recession is connected to the corresponding unleveled surface by slanted surfaces located at opposite ends thereof along the rotational direction.

11. The hinge of claim 1, wherein each protrusion is connected to the corresponding unleveled surface by slanted surfaces located at opposite ends thereof along the rotational direction.

12. An interference apparatus comprising:
a first interference element defining a circular first through hole and comprising a first stepped surface having a plurality of steps at one side surface thereof, and comprising a protrusion in each step; and a second interference element defining a non-circular second through hole and comprising a second stepped surface having a plurality of steps at one side surface thereof facing the first interference element, the second stepped surface being corresponding to and engagable with the first stepped surface of the first interference element, the second interference element defining a recession protruding from each of the steps of the second stepped surface thereof; the recessions of the second interference element being capable of engaging the protrusions of the first interference element, respectively.

13. The interference apparatus of claim 12, wherein the protrusions are opposite across the first through hole.

14. The interference apparatus of claim 12, wherein the recessions are opposite across the second through hole.

15. The interference apparatus of claim 12, wherein the steps of the first stepped surface of the first interference element comprises a first inner circle neighboring and surrounding the first through hole, and a first outer circle neighboring a circumference of the first interference element and surrounding the first inner circle; the first inner circle rising from the first outer circle.

16. The interference apparatus of claim 15, wherein the steps of the second stepped surface of the second interference element comprise a second inner circle neighboring and surrounding the second through hole of the second interference element, and a second outer circle neighboring a circumference of the second interference element and surrounding the second inner circle; the second inner circle being descended from the second outer circle.

17. The interference apparatus of claim 12, wherein the steps of the first stepped surface of the first interference element comprise a first inner circle neighboring and surrounding the first through hole of the first interference element, and a first outer circle neighboring a circumference of the first interference element and surrounding the first inner circle; the first inner circle descending from the first outer circle.

18. The interference apparatus of claim 17, wherein the steps of the second stepped surface of the second interference element comprise a second inner circle neighboring and surrounding the second through hole of the second interference element, and a second outer circle neighboring a circumference of the second interference element and surrounding the second inner circle; the second inner circle rising from the second outer circle.

19. The interference apparatus of claim 12, wherein the recessions are connected to the corresponding step by slanted surfaces located at opposite ends thereof.

20. The interference apparatus of claim 12, wherein the protrusions are connected to the corresponding step by slanted surfaces located at opposite ends thereof.

* * * * *